United States Patent [19]

Yoshida

[11] Patent Number: 5,311,579
[45] Date of Patent: May 10, 1994

[54] IMAGE COMMUNICATION APPARATUS WITH INSTRUCTED COMMUNICATION RESULT TRANSMITTAL

[75] Inventor: Takehiro Yoshida, Tokyo, Japan

[73] Assignee: Canon Kabushiki Kaisha, Tokyo, Japan

[21] Appl. No.: 109,199

[22] Filed: Aug. 5, 1993

Related U.S. Application Data

[63] Continuation of Ser. No. 815,619, Jan. 7, 1992, abandoned, which is a continuation of Ser. No. 517,196, May 1, 1990, abandoned.

[30] Foreign Application Priority Data

May 8, 1989 [JP] Japan ................................. 1-113663

[51] Int. Cl.$^5$ ........................................... H04M 11/00
[52] U.S. Cl. ................... 379/100; 379/102; 379/98; 358/402
[58] Field of Search ............... 379/88, 89, 100, 98, 379/102; 358/400, 444, 402

[56] References Cited

U.S. PATENT DOCUMENTS

| | | | |
|---|---|---|---|
| 4,774,590 | 9/1988 | Haganuma et al. | 358/401 |
| 4,893,333 | 1/1990 | Baran et al. | 379/100 |
| 4,941,170 | 7/1990 | Herbst | 358/402 |
| 4,994,926 | 2/1991 | Gordon et al. | 379/114 X |

FOREIGN PATENT DOCUMENTS

| | | | |
|---|---|---|---|
| 59-169262 | 9/1984 | Japan | 379/100 |
| 59-214365 | 12/1984 | Japan | 379/100 |
| WO87/07801 | 12/1987 | World Int. Prop. O. | 379/100 |

OTHER PUBLICATIONS

IEICE Technical Report (Japan), by Morimoto et al., Apr. 1987 "A case of member's management in a multi--media mail system".

Primary Examiner—James L. Dwyer
Assistant Examiner—Ahmad F. Matar
Attorney, Agent, or Firm—Fitzpatrick, Cella, Harper & Scinto

[57] ABSTRACT

An image communication apparatus performs polling transmission of the information relating to the past communicating processing, or polling transmission of the received image data in the image memory, which is discriminated by the discriminating information included in the information, to the other station in accordance with a requirement by control information or a communication procedure from a calling station.

14 Claims, 4 Drawing Sheets

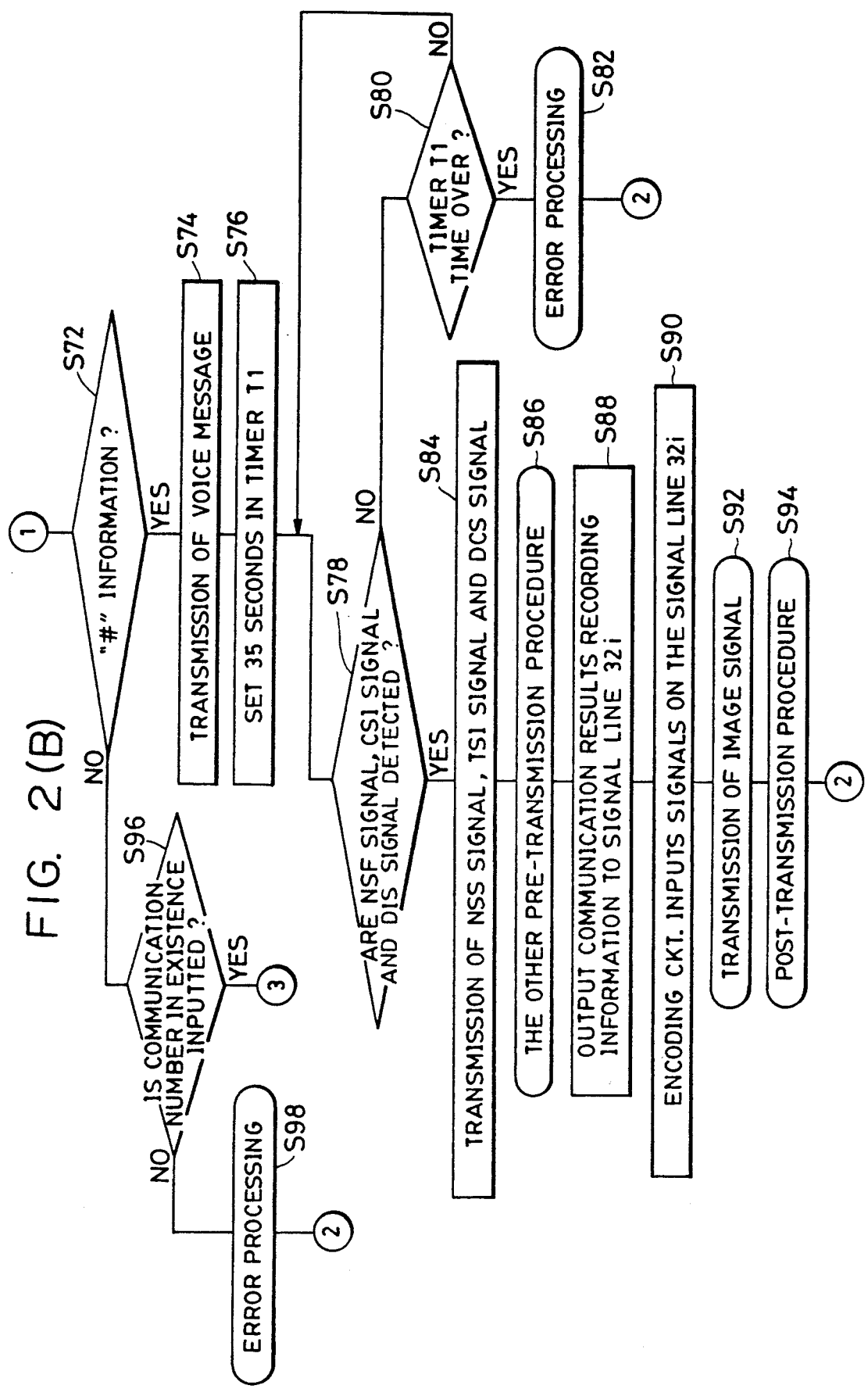

IMAGE COMMUNICATION APPARATUS WITH INSTRUCTED COMMUNICATION RESULT TRANSMITTAL

This application is a continuation of application Ser. No. 07/815,619 filed on Jan. 7, 1992, which is a continuation of application Ser. No. 07/517,196 filed on May 1, 1990 both abandoned.

FIELD OF THE INVENTION

This invention relates to an image communication apparatus, and more specifically relates to an image communication apparatus which performs polling processing for transmitting image data when a requirement by a predetermined communication procedure is received from a calling station.

RELATED BACKGROUND ART

A polling processing for transmitting image data from called station by a predetermined communication procedure received from a calling station is already known. However, in a conventional facsimile apparatus which has the function of polling transmission the information which is available for polling transmission is limited as follows.

A first type of information which is available for polling transmission is information that a document is set on a document platen.

A second type of information which is available for polling transmission is document information stored in a memory at the polling transmission side.

A third type of information which is available for polling transmission is information received in a designated memory.

However, it has been a defect that information for polling transmission has been limited in the above mentioned polling processing.

That is, the polling transmission of optional information received in a memory was not available in the above mentioned polling processing.

For example, it was impossible to see received image information or to confirm whether or not there was received data outside of the office.

SUMMARY OF THE INVENTION

The present invention has been made in consideration of the above situation and intends as its object to improve an image communication apparatus.

Another object of the present invention is to provide an image communication apparatus that performs polling processing for transmitting arbitrary data.

Still another object of the present invention is to provide an image communication apparatus which performs superior data transmission with a simple construction.

It is another object of the present invention to provide an image communication apparatus capable of performing polling processing for transmitting image data when a requirement by a predetermined communication procedure is received from a calling station, comprising a control memory for storing information relating to a past communication processing and having a construction in that a polling transmission of the information relating to the past communication processing stored in the control memory is performed by a predetermined signal format when predetermined control information sent from calling station is detected.

It is still another object of the present invention to provide an image communication apparatus further comprising an image memory for storing received image data and having a construction in that a polling transmission of the received image data in the image memory, which is discriminated by discriminating information, to the other station is performed when the discriminating information included in the information relating to the past communication processing is transmitted by a predetermined communication procedure.

According to the construction of the present invention, polling transmission of the information relating to the past communicating processing or polling transmission of the received image data in the image memory, which is discriminated by the discriminating information included in the information, to the other station can be performed in accordance with a requirement by control information or a communication procedure from a calling station.

The other objects, features and advantages of the invention will become apparent from the following detailed description of the preferred embodiments of the present invention and the accompanying drawings.

DETAILED DESCRIPTION OF THE PREFERRED EMBODIMENTS

Preferred embodiments of the present invention will be described in detail below with reference to the accompanying drawings.

Figure 1:
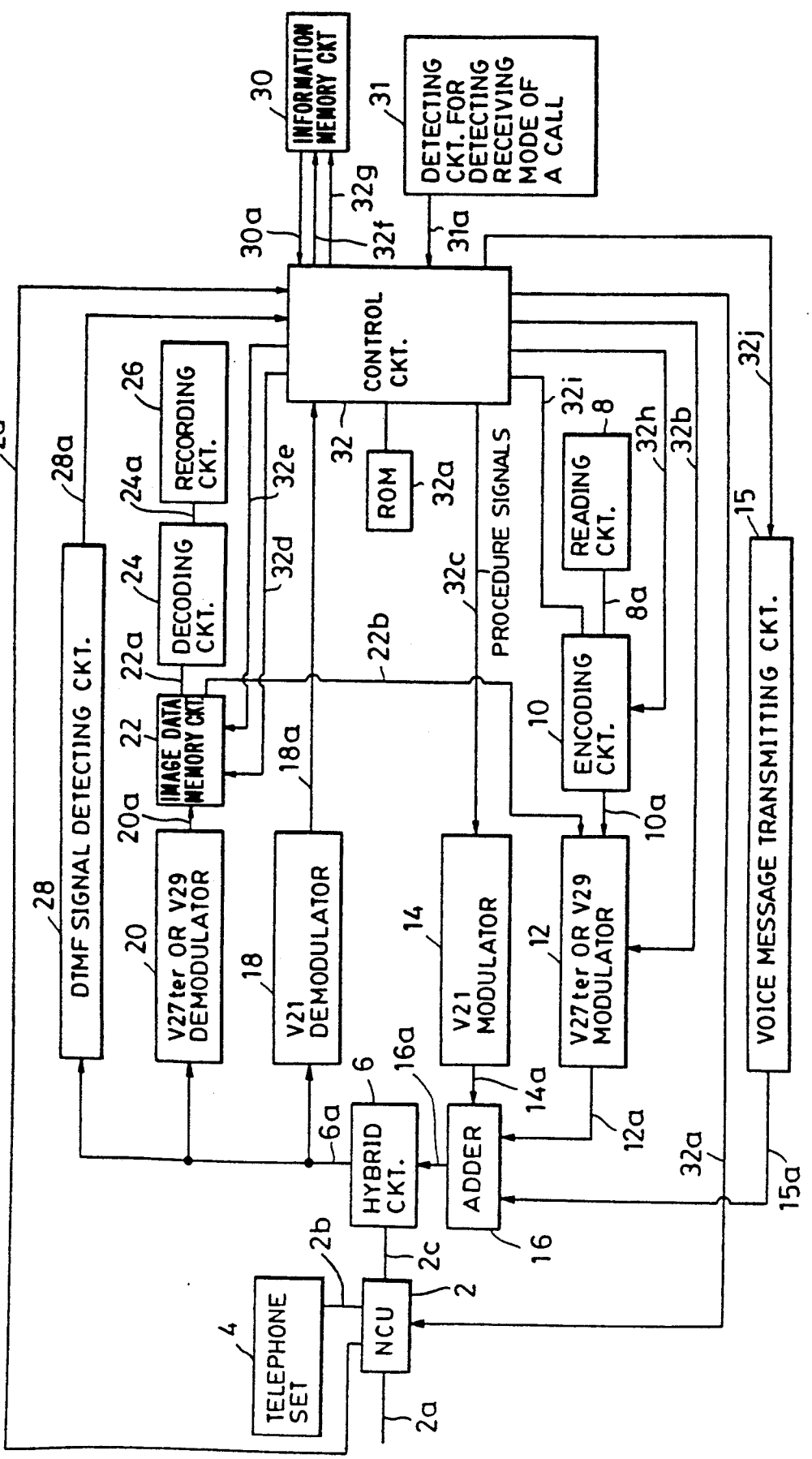
FIG. 1 shows a block diagram of a facsimile apparatus to which the embodiment of this invention is applied.

FIG. 1 is a block diagram showing an arrangement of a facsimile apparatus according to the present invention.

The facsimile apparatus in FIG. 1 includes an NCU (Network Control Unit) 2 for connecting a terminal to a telephone network, for changing the connection to data communication from speech communication and for holding a loop closed to use the telephone network for data communication. Signal line 2a connected to the NCU 2 is a telephone line.

When the NCU 2 receives a signal from a signal line 32a, and if the signal level of the line 32a is "0", the NCU 2 connects the telephone line 2a to a telephone set 4 by connecting the telephone line 2a to a signal line 2b.

On the other hand, if the signal level of the line 32a is "1", the NCU 2 connects the telephone line 2a to a facsimile apparatus by connecting the telephone line 2a to a signal line 2c.

In a normal condition or a standby state, the telephone line 2a is connected to the telephone set 4 by the NCU 2. The NCU 2 outputs a signal of signal level "1" on a signal line 2d when it detects a call signal and outputs a signal of signal level "0" on the signal line 2d when it does not detect a call signal.

The facsimile apparatus also includes a hybrid circuit 6 for separating signals for transmission from received signals. The signals for transmission on a signal line 16a are sent to the telephone line through the signal line 2c and the NCU 2. The received signals from the other station are sent to a signal line 6a through the NCU 2 and the signal line 2c.

A reading circuit 8 is also provided for reading image signals from a document to be sent, for each line of the main scanning direction sequentially, and for making the image signals into a series of binary signals representing binary values of white and black. The reading circuit is constructed with an imaging device such as a CCD (Charge Coupled Device), an optical system and a document transmitting system. The series of binary signals representing binary values of white and black is transmitted to an encoding circuit 10 through a signal line 8a.

An encoding circuit 10 receives the binary signals output on the signal line 8a for encoding the binary signals to MH (Modified Huffman) code signals or to MR (Modified Read) code signals and outputs the encoded signals to a signal line 10a.

A V27 ter or V29 modulator 12 is provided for modulating image signals based on the V27 ter recommendation (Differential Phase Modulation) or the V29 recommendation (Quadrature Modulation).

The modulator 12 receives the signals output on the signal line 10a for modulating the signals and outputs modulated signals to an adder circuit 16 through a signal line 12a.

A V21 modulator 14 is also provided for modulating procedure signals based on the V21 recommendation. The modulator 14 receives the procedure signals output on a signal line 32C for modulating the signals and outputs modulated signals to the adder circuit 16 through a signal line 14a. The adder circuit 16 is provided for receiving and adding the signals of the signal lines 12a and 14a, and for outputting an added signal to a signal line 16a.

A voice message transmitting circuit 15 is constructed with a PCM digital voice reproduction device, and further conventional elements. The voice message transmitting circuit 15 outputs a voice message recorded in advance to the adder circuit 16 through a signal line 15a in response to an input of a pulse through a signal line 32j.

A V21 demodulator 18 is provided for demodulating procedure signals based on the V21 recommendation in a receiving station.

The demodulator 18 receives the signals output on a signal line 6a for demodulating the signals based on the V21 recommendation and outputs demodulated signals to a control circuit 32 through a signal line 18a.

A V27 ter or V29 demodulator 20 is provided for demodulating image signals based on the V27 ter recommendation (Differential Phase Modulation) or the V29 recommendation (Quadrature Modulation). The demodulator 20 receives the signals output on the signal line 6a for demodulating the signals and outputs demodulated signals to a memory circuit 22 through a signal line 20a.

The memory circuit 22 is provided for storing received image data. The memory circuit 22 stores the communication identification number of received image data through a signal line 32d and the received information in the memory space sequentially by using a pointer.

The memory circuit 22 also outputs the stored data to either signal line 22a or 22b sequentially by the pointer. The memory circuit 22 outputs the received information to the signal line 22a in the case where a signal of signal level "0" is output to a signal line 32e. The memory circuit 22 outputs the received information to the signal line 22b in the case where a signal of signal level "1" is output to the signal line 32e. The memory circuit 22 erases the received information in response to a signal on the signal line 32d.

A decoding circuit 24 decodes data output on the signal line 22a and outputs MH or MR decoded data to a signal line 24a.

A recording circuit 26 is provided for recording image signals sequentially with the decoded data output on the signal line 24a.

A DTMF signal detecting circuit 28 is provided for detecting a DTMF signal with the data output on the signal line 6a. The DTMF signal detecting circuit 28 outputs information representing a detection of the DTMF signal to a signal line 28a.

A memory circuit 30 is provided for storing communication result recording information. For instance, the memory circuit 30 is constructed to store the communication result recording information of twenty communications in the past. The communication result recording information includes the communication number, connection ID (Identification), connection telephone number, operation starting time, operating time, number of pages sent/received and existence of error, etc.

A write pulse is output to a signal line 32f after outputting the communication number, connection ID, connection telephone number, operation starting time, operating time, number of pages sent/received and error information to a signal line 30a in the case of storing the communication result recording information in the memory circuit 30.

A read pulse is output to a signal line 32g after outputting a communication number to the signal line 30a in the case of reading out the communication result recording information from the memory circuit 30. The memory circuit 30 outputs the connection ID, connection telephone number, operation starting time, operating time, number of pages sent/received and error information corresponding to the communication number to the signal line 30a in response to the read pulse.

A detecting circuit 31 is provided for detecting the receiving mode of a call. The detecting circuit 31 outputs a signal of signal level "1" to a signal line 31a in the case where a manual receiving mode of a call is set, and outputs a signal of signal level "0" to the signal line 31a in the case where the manual receiving mode of a call is not set.

A control circuit 32 is provided for controlling each portion described above, and is constructed with a microprocessor. A communication control procedure of the control circuit 32 is stored in a ROM 32a as a control program.

An operation of the facsimile apparatus in FIG. 1 will be described below.

The facsimile apparatus in FIG. 1 transmits an initial identification signal, NSF (Non-Standard Facilities)—CSI (Called Subscriber Identification)—DIS (Digital Identification Signal), following a transmission of a CED (Called Station Identification) signal when an automatic receiving mode of a call is set and a calling signal of 16 Hz is detected.

Following the above mentioned operation, the facsimile apparatus performs a communication operation when a procedure signal of a calling station is detected, and transmits information representing "please input information to be sent" using a voice message when a tone signal corresponding to "#" of the DTMF signal is detected.

An operator of the calling station sends a tone signal corresponding to "*" of the DTMF signal and presses a start button when he requests polling reception of communication result recording information.

When the facsimile apparatus in FIG. 1 detects the "*" signal, it transmits the NSS (Non-Standard Facilities Set Up) signal, TSI (Transmitting Subscriber Identification) signal, DCS (Digital Command Signal) signal, the signal for training and TCF (Training Check) signal after detecting the NSF signal, CSI signal and DIS signal. The facsimile apparatus transmits the communication result recording information as image information after detecting the CFR (Confirm to Receive) signal.

The operator of the calling station can request a transmission of desired image information and depends on the check of the transmitted communication result recording information. When he requests a transmission of desired image information, he sends a tone signal corresponding to "*" of the DTMF signal again.

The facsimile apparatus in FIG. 1 transmits a voice message representing "please input information to be sent" upon receiving the tone signal.

After that, the operator of the calling station designates a four digit communication number with the DTMF signal and presses the start button.

Figure 2A:
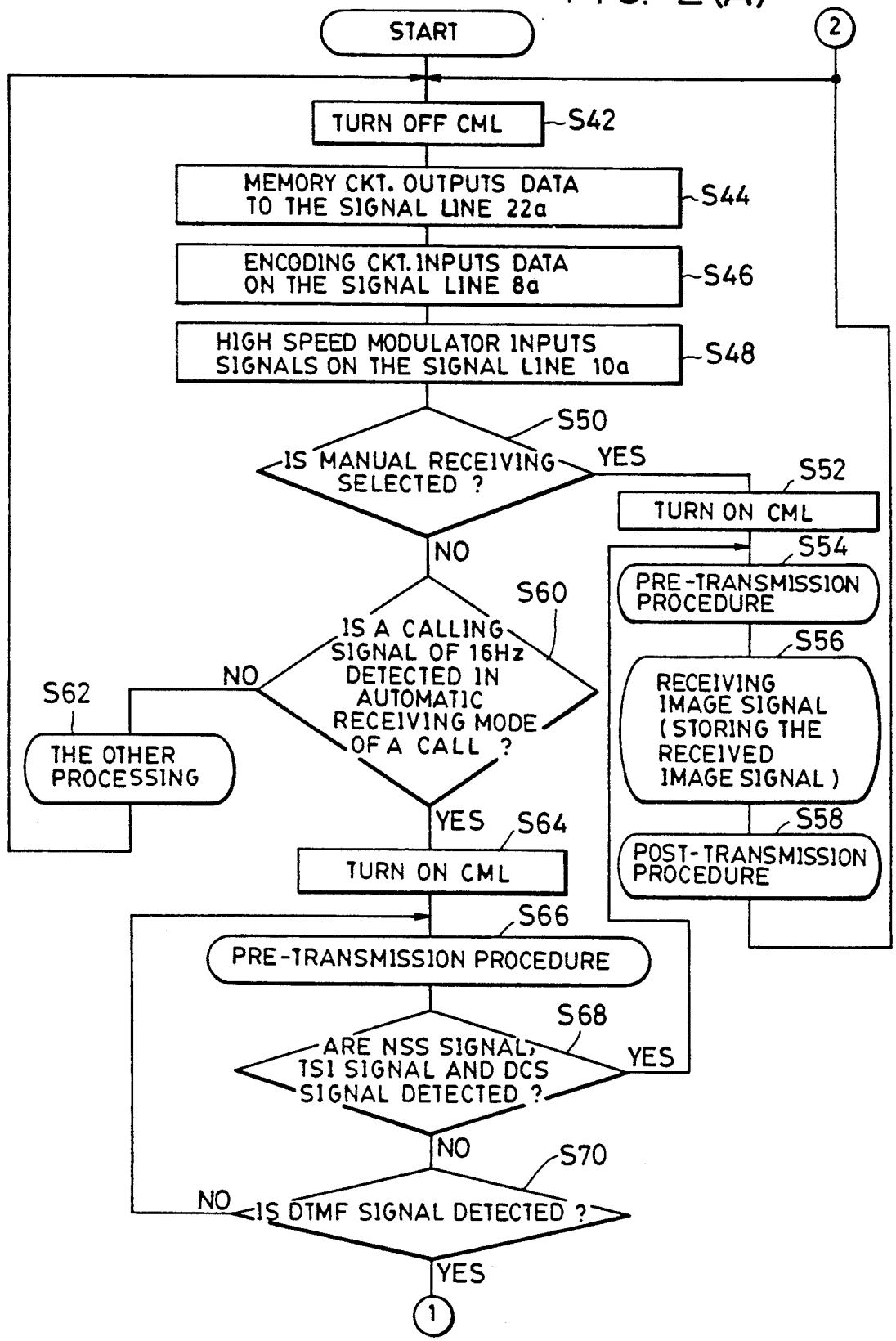
FIG. 2 (A) through FIG. 2 (C) are flowcharts illustrating a control procedure which a control circuit in FIG. 1 carries out.
Figure 2C:
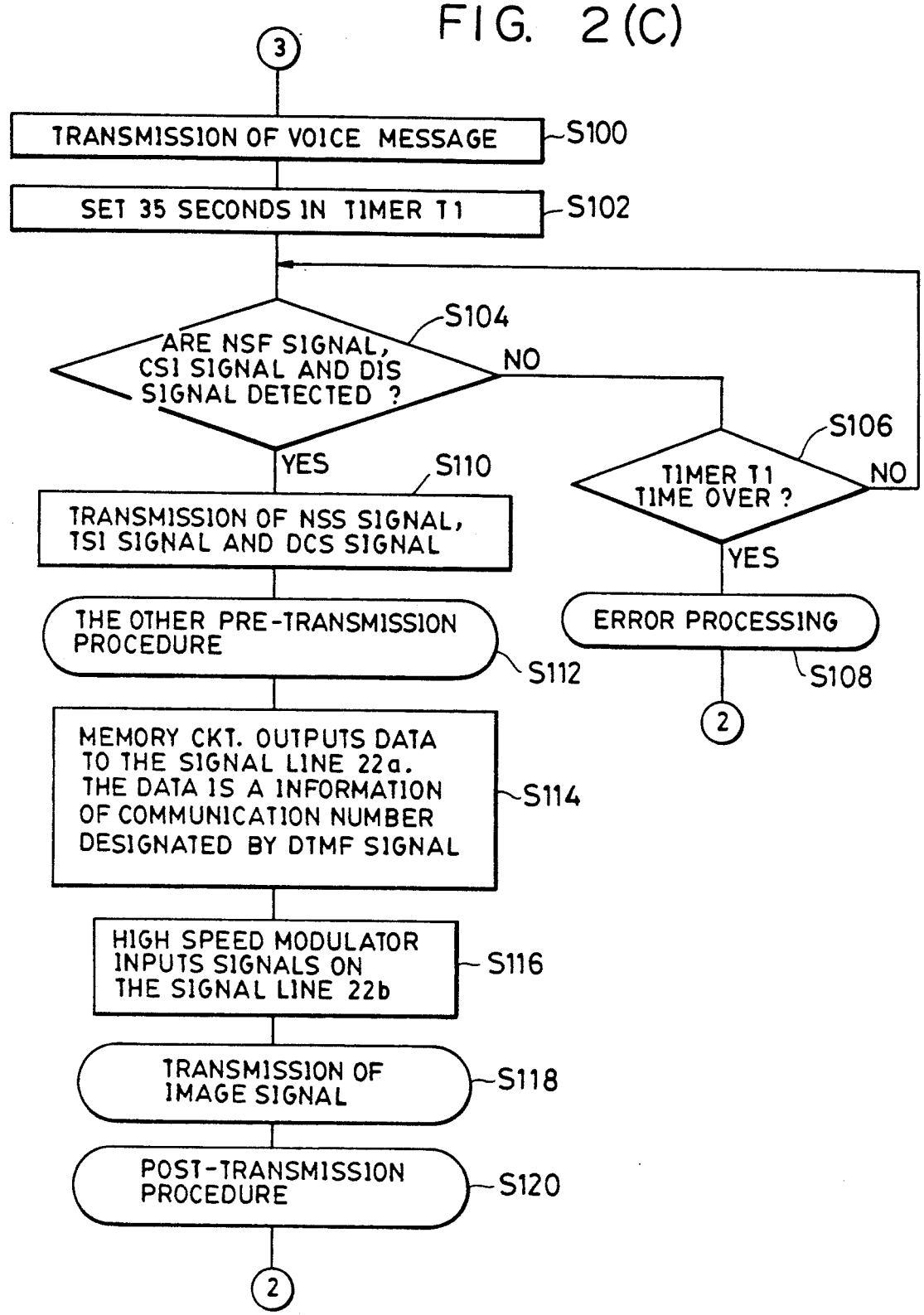

When the facsimile apparatus detects the four digit DTMF signal, which designates the communication number, it transmits the NSS signal, the TSI signal, the DCS signal, the signal for training and the TCF signal after detecting the NSF signal, the CSI signal and the DIS signal. Then the apparatus transmits the image information of the designated communication number after detecting the CFR signal. FIG. 2 (A) through FIG. 2 (C) show the communication control procedure of control circuit 32 stored in ROM 32a. The steps having same number in each flowchart of programs are the same.

Referring to FIG. 2 (A), in steps S42 through S48, an initialization setting is performed.

In step S42, the control circuit 32 deenergizes the CML relay of the NCU 2 and switches the telephone line 2a to the telephone set 4 by outputting a signal of signal level "0" to the signal line 32a.

In step S44, the control circuit 32 sets the memory circuit 22 in such a way that the memory circuit 22 outputs data to the signal line 22a by outputting a signal of signal level "0" to the signal line 32e. In step S46, the control circuit 32 sets the encoding circuit 10 in such a way that the encoding circuit 10 inputs data output on the signal line 8a by outputting a signal of signal level "0" to the signal line 32h. In step S48, the control circuit 32 outputs a signal of signal level "0" to the signal line 32b and instructs the high speed modulator 12 for modulating image signals to input the signals on the signal line 10a.

In step S50, it is determined whether manual communication is selected or not. When, in step S50, manual communication is selected, the control circuit 32 turns on the CML relay of the NCU 2 and switches the telephone line 2a to the hybrid circuit 6 in step S52.

In steps S54, S56, S58, a conventional receiving operation is performed. In step S56, received image data is also stored in the memory circuit 22.

When, in step S50, manual communication is not selected, the flow advances to step S60.

In step S60, the control circuit 32 inputs signals on the signal lines 2d, 31a respectively and checks whether an automatic receiving mode of a call is selected or not, and checks whether a calling signal of 16 Hz is detected or not. If both are, the flow advances to step S64, but if not, the flow advances to step S62 to carry out other conventional communication processes. In step S64, the control circuit 32 turns on the CML relay of the NCU 2 by outputting a signal of signal level "1" to the signal line 32a, i.e., the control circuit switches the telephone line 2a to the hybrid circuit 6.

In step S66, the control circuit 32 carries out a conventional pre-transmission procedure, and the control circuit 32 checks whether the NSS signal, the TSI signal and the DCS signal are detected or not in step S68. If so, the flow advances to step S54, but if not, the flow advances to step S70.

In step S70, the control circuit 32 inputs signals on the signal line 28a and checks whether the DTMF signal is detected or not. If it is, the flow advances to step S72 in FIG. 2 (B), but if not, the flow advances to step S66.

In step S72 in FIG. 2 (B), the control circuit 32 checks whether the detected DTMF signal is a tone signal corresponding to "#" for transmitting communication result recording information or not. If it is, the flow advances to step S74, but if not, for example, if a tone signal corresponding to "*" for requesting transmission of the received image data in the memory circuit 22 is transmitted, the flow advances to step S96.

In step S74, the control circuit 32 generates a command pulse to the signal line 32j for transmitting a voice message and causes the voice message transmitting circuit 15 to transmit a voice message representing "please input information to be sent" to the other station. In step S76, a count time of 35 seconds is set in a timer T1 which is constituted by software or hardware of the control circuit 32.

The control circuit 32 checks in steps S78 and S80, whether the NSF signal, the CSI signal and the DIS signal are detected within the set time of timer T1 or not. If the NSF signal, the CSI signal and the DIS signal are detected within the predetermined time T1, the control circuit 32 transmits the NSS signal, the TSI signal and the DCS signal in step S84, and further carries out the other pre-transmission procedures in step S86. If a time over of the predetermined time T1 occurrs, an error processing is performed in step S82.

In step S88, the control circuit 32 inputs the communication result recording information from the memory circuit 30 and outputs the information to the signal line 32i.

In this step, the control circuit 32 appends a predetermined mark, etc. to a communication number corresponding to a communication by which image data is stored in the memory circuit 22 at the current time, and informs the other station of the communication.

The conversion from the communication result recording information into image information is performed by using a character generator (not shown), etc.

In step S90, the control circuit 32 outputs a signal of signal level "1" to the signal line 32h and instructs the encoding circuit 10 to input signals on the signal line 32i. The image data of the communication result recording information output from the signal line 32i is input to the encoding circuit 10 in accordance with the instruction and the image data is transmitted to the other station in step S92.

In step S94, the control circuit 32 executes a post-transmission procedure.

In step S96, it is checked whether information of the communication number designated by the DTMF signal is stored in the memory circuit 22 or not. If it is, the flow advances to step S100, but if not, an error processing is performed in step S98.

In step S100 in FIG. 2 (C), the control circuit 32 generates the command pulse to the signal line 32j for transmitting voice message and causes the voice message transmitting circuit 15 to transmit the voice message representing "please input an information to be sent" to the other station. In step S102, a count time of 35 seconds is set in the timer T1.

The control circuit 32 checks in step S104, S106 whether the NSF signal, the CSI signal and the DIS signal are detected within the set time of timer T1 or not. If the NSF signal, the CSI signal and the DIS signal are detected within the predetermined time T1, the control circuit 32 transmits NSS signal, TSI signal and DCS signal in step S110, and further carries out the other pre-transmission procedure in step S112. If a time over of the predetermined time T1 is occurred, an error processing is performed in step S108.

In step S114, the control circuit 32 sets the memory circuit 22 through the signal line 32d, 32e to output an information of communication number designated by the DTMF signal to the signal line 22b.

In step S116, the control circuit 32 outputs a signal of signal level "1" to the signal line 32b and instructs the modulator 12 to input signals on the signal line 22b.

In step S118, the control circuit 32 sets the memory circuit 22 in such a way that the memory circuit transmits the stored image data designated by the DTMF signal to the other station.

In step S120, the control circuit 32 carries out a post-transmission procedure.

According to the embodiment as described above, the communication result can be transmitted as image information by transmitting the DTMF signal and the received image data, which is received in the memory circuit by a communication indicated in the communication result recording information, and can be transmitted by a sequence of the DTMF signal.

Thereby, a user can recognize whether or not there was a communication from outside or can cause the apparatus to transmit the image data transmitted from the other important station by designating the image data.

In the above mentioned embodiment, a voice message is transmitted by detecting "#" signal of the DTMF signal after transmitting the NSF signal, the CSI signal and the DIS signal. After the transmission of the voice message, polling transmission is performed irrespective of a polling information included in the NSF signal when the NSF signal, the CSI signal and the DIS signal are detected after receiving a polling transmission instruction of the communication result recording information or after receiving a polling transmission instruction of the received image information stored in the memory circuit by the DTMF signal.

However, the above mentioned polling transmission may be controlled in accordance with a polling information included in the NSF signal without performing the polling transmission unconditionally.

Polling transmission of the other control information in addition to the polling transmission of the communication result recording information may be performed.

As explained above, the present invention provides an image communication apparatus capable of performing polling processing for transmitting image data when a requirement by a predetermined communication procedure is received from a calling station comprising control memory for storing information relating to a past communicating processing and having a construction in that a polling transmission of the information relating to the past communication processing stored in the control memory is performed by a predetermined signal format when a predetermined control information sent from calling station is detected.

The present invention provides an image communication apparatus further comprising image memory for storing a received image data and having a construction in that a polling transmission of the received image data in the image memory, which is discriminated by discriminating information, to the other station is performed when the discriminating information included in the information relating to the past communication processing is transmitted by a predetermined communication procedure.

According to the construction of the present invention, polling transmission of the information relating to the past communication processing or polling transmission of the received image data in the image memory, which is discriminated by the discriminating information included in the information, to the other station can be performed in accordance with a requirement by a control information or a communication procedure from a calling station.

The present invention provides an improved image communication apparatus in which, for example, a user can recognize whether or not there was a received data from a remote location or can obtain received image data in the remote location in case of urgency.

Although particular embodiments of the present invention are herein disclosed for purposes of explanation, various modifications thereof, after study of this specification, will be apparent to those skilled in the art to which the invention pertains.

What is claimed is:

1. An image communicating apparatus comprising:
   receiving means for receiving image data;
   first memory means for storing received image data, wherein said first memory means stores plural kinds of image data;
   recording means for recording the image data stored in said first memory means;
   second memory means for storing information regarding a communication result of each image data received by said receiving means, the information including information indicating whether or not the received image data are stored in said first memory means; and
   transmission means for transmitting the information stored in said second memory means as image information to a calling station in accordance with a first instruction signal from the calling station, and transmitting image data stored in the first memory means to the calling station in accordance with a second instruction signal from the calling station.

2. An image communication apparatus according to claim 1, wherein the information regarding the communication result includes discriminating information which discriminates each image data in the first memory means.

3. An image communication apparatus according to claim 2, wherein the second instruction signal includes said discriminating information, said transmission means reads out the image data which correspond to the discriminating information in the second instruction signal from the first memory means and transmits the read out image data.

4. An image communication method, comprising the steps of:
   receiving a plurality of image data,
   storing the received image data,
   recording the stored image data,
   storing information regarding each communication result of said plurality of received image data, the information including information indicating whether or not the received image data are stored,
   transmitting the information regarding each communication result as image information to a calling station in accordance with a first instruction signal from the calling station, and
   transmitting the received image data to the calling station in accordance with a second instruction signal from the calling station.

5. An image communicating method according to claim 4, wherein said information regarding the communication result includes discriminating information which discriminates each image data.

6. An image communicating method according to claim 5, wherein said second instruction signal includes said discriminating information, and image data which correspond to the discriminating information of the second instruction signal are selected and transmitted to the calling station.

7. An image communicating method according to claim 4, wherein said information regarding the communication result are transmitted as image data.

8. An image communicating apparatus comprising:
   receiving means for receiving image data;
   first memory means for storing received image data, wherein said first memory means stores plural kinds of image data;
   recording means for recording the image data stored in said first memory means;
   second memory means for storing information regarding a communication result of each image data received by said receiving means, the information including information indicating an existence of a communication error; and
   transmission means for transmitting the information stored in said second memory means as image information to a calling station in accordance with a first instruction signal from the calling station, and transmitting image data stored in the first memory means to the calling station in accordance with a second instruction signal from the calling station.

9. An image communication apparatus according to claim 8, wherein the information regarding the communication result includes discriminating information which discriminates each image data in the first memory means.

10. An image communication apparatus according to claim 9, wherein the second instruction signal includes said discriminating information, said transmission means reads out the image data which correspond to the discriminating information in the second instruction signal from the first memory means and transmits the read out image data.

11. An image communication method, comprising the steps of:
    receiving a plurality of image data,
    storing the received image data,
    recording the stored image data,
    storing information regarding each communication result of said plurality of received image data, the information including information indicating an existence of a communication error,
    transmitting the information regarding each communication result as image information to a calling station in accordance with a first instruction signal from the calling station, and
    transmitting the received image data to the calling station in accordance with a second instruction signal from the calling station.

12. An image communication method according to claim 11, wherein said information regarding the communication result includes discriminating information which discriminates each image data.

13. An image communication method according to claim 12, wherein said second instruction signal includes said discriminating information, and image data which correspond to the discriminating information of the second instruction signal are selected and transmitted to the calling station.

14. An image communication method according to claim 11, wherein said information regarding the communication result is transmitted as image data.

* * * * *